United States Patent
Hagio et al.

(10) Patent No.: US 7,834,305 B2
(45) Date of Patent: Nov. 16, 2010

(54) IMAGE PROCESSING DEVICE

(75) Inventors: Kenichi Hagio, Toyonaka (JP); Motoo Ikari, Kyoto (JP); Yuji Takada, Kyoto (JP); Yusuke Hashimoto, Neyagawa (JP); Fumi Tsunesada, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 1079 days.

(21) Appl. No.: 10/599,615

(22) PCT Filed: Jul. 28, 2005

(86) PCT No.: PCT/JP2005/014268

§ 371 (c)(1),
(2), (4) Date: Oct. 3, 2006

(87) PCT Pub. No.: WO2006/011674

PCT Pub. Date: Feb. 2, 2006

(65) Prior Publication Data

US 2007/0237363 A1    Oct. 11, 2007

(30) Foreign Application Priority Data

Jul. 30, 2004 (JP) ............................ 2004-224480
Aug. 30, 2004 (JP) ............................ 2004-250805
Nov. 30, 2004 (JP) ............................ 2004-347713

(51) Int. Cl.
*G01S 17/36* (2006.01)
*H01J 40/14* (2006.01)

(52) U.S. Cl. ................ 250/214 R; 250/208.1; 250/221; 382/106

(58) Field of Classification Search .......... 250/208.1, 250/221, 214 R, 559.2, 559.22, 559.38; 356/3, 356/3.12, 4.07; 382/106, 154

See application file for complete search history.

(56) References Cited

U.S. PATENT DOCUMENTS 5,754,280 A    5/1998    Kato et al.

(Continued)

FOREIGN PATENT DOCUMENTS

JP    60-11105    1/1985

(Continued)

OTHER PUBLICATIONS

English language Abstract of JP 1-100492, Apr. 18, 1989.

(Continued)

*Primary Examiner*—Kevin Pyo
(74) *Attorney, Agent, or Firm*—Greenblum & Bernstein P.L.C.

(57) ABSTRACT

An image processing device for generating both of a distance image and a gray image from an electrical output of a light receiving element on the precondition that a light intensity-modulated at a modulation frequency is irradiated into a target space. This device has an image generator for generating the distance image having pixel values, each of which provides a distance value between an object in the target space and the device, in accordance with a phase difference between the irradiated light and the received light, and the gray image having pixel values, each of which provides a gray value of the object, in accordance with an intensity of the received light. By use of an output of the image generator, an outline of the object can be extracted.

10 Claims, 11 Drawing Sheets

U.S. PATENT DOCUMENTS

| | | | |
|---|---|---|---|
| 5,856,667 | A | 1/1999 | Spirig et al. |
| 6,057,909 | A | 5/2000 | Yahav et al. |
| 6,091,905 | A | 7/2000 | Yahav et al. |
| 6,100,517 | A | 8/2000 | Yahav et al. |
| 6,373,557 | B1 | 4/2002 | Mengel et al. |
| 6,445,884 | B1 | 9/2002 | Yahav |
| 6,449,004 | B1 | 9/2002 | Okisu et al. |
| 6,825,455 | B1 | 11/2004 | Schwarte |
| 7,119,350 | B2 | 10/2006 | Hashimoto et al. |
| 7,138,646 | B2 * | 11/2006 | Hashimoto et al. ..... 250/559.38 |
| 7,355,648 | B1 | 4/2008 | Braun et al. |
| 7,423,658 | B1 | 9/2008 | Uomori et al. |
| 2001/0055482 | A1 | 12/2001 | Braun et al. |
| 2003/0123869 | A1 | 7/2003 | Kohno et al. |
| 2004/0114921 | A1 | 6/2004 | Braun et al. |
| 2004/0195493 | A1 | 10/2004 | Hashimoto et al. |
| 2005/0092897 | A1 | 5/2005 | Schwarte |
| 2005/0145773 | A1 | 7/2005 | Hashimoto et al. |
| 2005/0178946 | A1 | 8/2005 | Hashimoto et al. |

FOREIGN PATENT DOCUMENTS

| | | |
|---|---|---|
| JP | 64-10108 | 1/1989 |
| JP | 1-100492 | 4/1989 |
| JP | 4-169805 | 6/1992 |
| JP | 5-45124 | 2/1993 |
| JP | 7-110381 | 4/1995 |
| JP | 9-54158 | 2/1997 |
| JP | 9-289611 | 11/1997 |
| JP | 10-31742 | 2/1998 |
| JP | 10-508736 | 8/1998 |
| JP | 11-508359 | 7/1999 |
| JP | 11-284997 | 10/1999 |
| JP | 2000-517427 | 12/2000 |
| JP | 2001-103368 | 4/2001 |
| JP | 2001-124544 | 5/2001 |
| JP | 2001-209827 | 8/2001 |
| JP | 2003-195155 | 7/2003 |
| JP | 2003-240545 | 8/2003 |
| JP | 2003-247805 | 9/2003 |
| JP | 2004-32682 | 1/2004 |
| JP | 2004-45304 | 2/2004 |
| JP | 2004-180165 | 6/2004 |
| JP | 2004-205222 | 7/2004 |
| JP | 2004-309310 | 11/2004 |
| WO | 03/085413 | 10/2003 |
| WO | 2004/008175 | 1/2004 |

OTHER PUBLICATIONS

English language Abstract of JP 4-169805, Jun. 17, 1992.
English language Abstract of JP 7-110381, Apr. 25, 1995.
English language Abstract of JP 60-11105, Jan. 21, 1985.
English language Abstract of JP 2004-32682, Jan. 29, 2004.
English language Abstract of JP 10-508736, Aug. 25, 1998.
English language Abstract of JP 2000-517427, Dec. 26, 2000.
Schwarte et al., "New Powerful Sensory Tool in Automotive Safety Systems Based on PMD-Technology" in "Advanced Microsystems for Automotive Applications 2000," edited by Kruger et al., Apr. 6-7, 2000, Berlin, Springer-Verlag, Apr. 5, 2000, pp. 181-203, XP8025759.
English language Abstract of JP 11-284997, Oct. 1999.
English language Abstract of JP 64-10108, Jan. 1989.

* cited by examiner

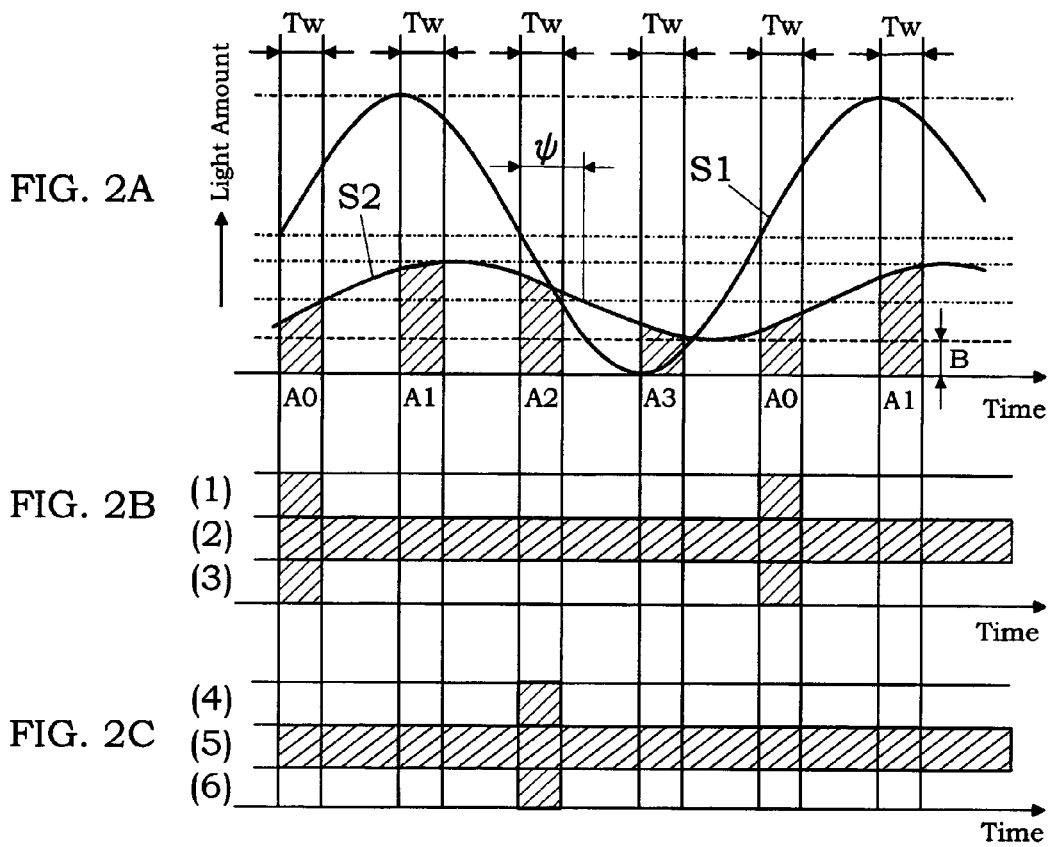
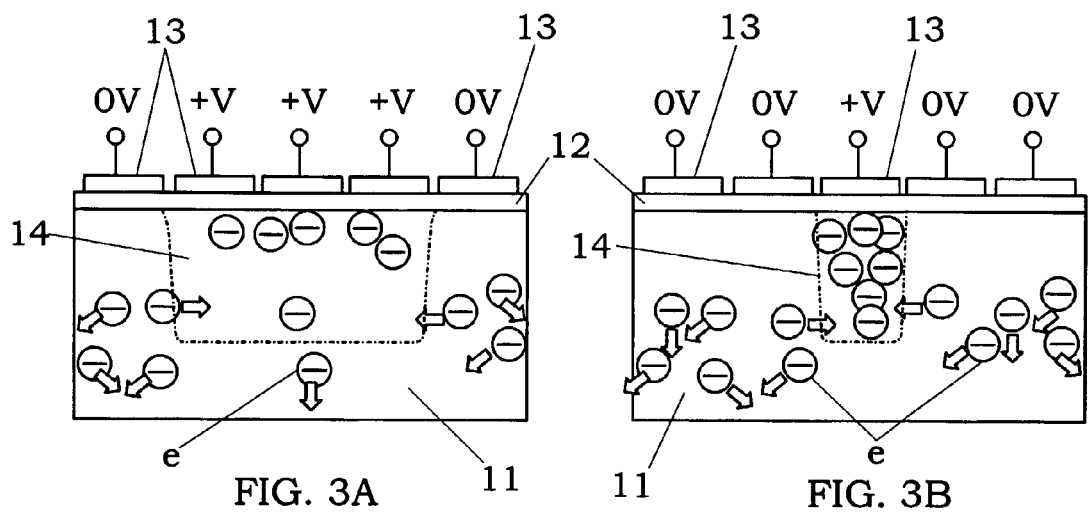

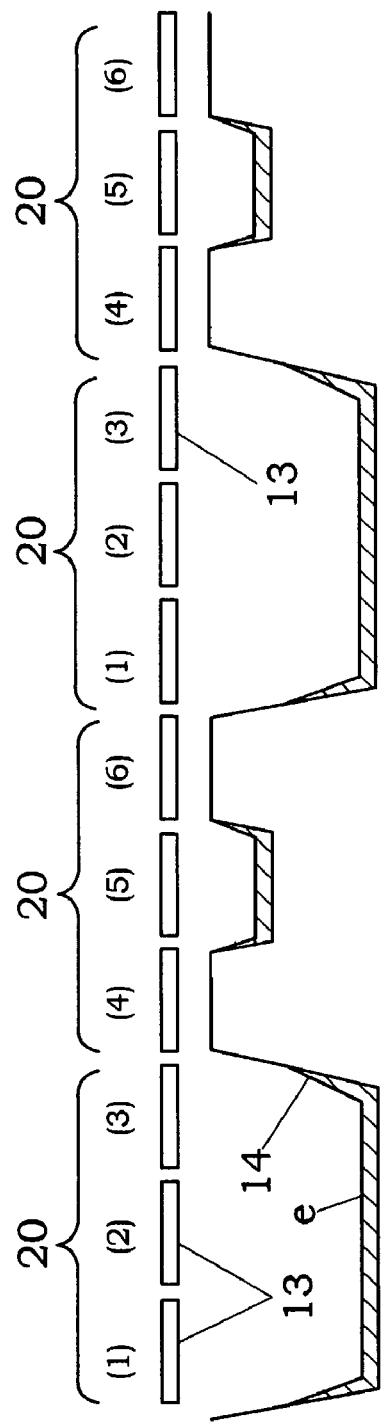
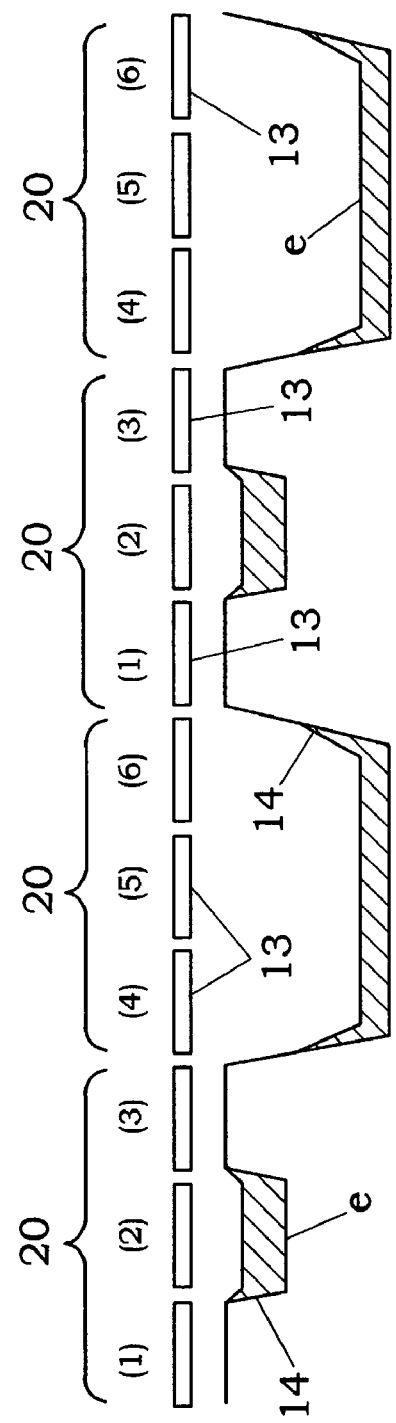
FIG. 7A
FIG. 7B

|     |     |     |
| --- | --- | --- |
| p1  | p2  | p3  |
| p4  | p5  | p6  |
| p7  | p8  | p9  |

IMAGE PROCESSING DEVICE

TECHNICAL FIELD

The present invention relates to an image processing device for extracting spatial information form a target space, into which an intensity-modulated light is irradiated.

BACKGROUND ART

In the past, various types of spatial information detecting devices for measuring distance information of an object or extracting an outline of the object from an output of image pickup means have been proposed. For example, Japanese Patent Publication Laid-open No. 11-284997 discloses a technique of extracting the outline of the object from a gray image generated by use of an image sensor. In addition, Japanese Patent Publication Laid-open No. 64-10108 discloses a technique of determining a distance with the object by irradiating a spot-like or linear light pattern to an object, receiving a light reflected from the object by a position sensitive detector (PSD), and converting an output of the position sensitive detector into the distance in accordance with a triangular surveying method. In addition, PCT Gazette WO03/085413 discloses a spatial information detecting device for detecting spatial information such as distance from an electrical output corresponding to an intensity of received light, which is obtained by irradiating a light intensity-modulated at an emission frequency to a target space, and receiving the light reflected from an object in the target space.

By the way, a greater amount of spatial information can be obtained by using both of the gray image and the distance information. However, according to the conventional techniques, since each of gray values of the gray image and a corresponding distance value are not obtained from the same pixel, a treatment of associating each of positions in the gray image with corresponding distance value is separately needed. For example, since a light is scanned in a target space in the apparatus using the triangular surveying method, a relatively large time lag between the generation of the gray image and the generation of the distance information occurs, so that the associating treatment therebetween becomes complex. In addition, when using both of the device for generating the gray image such as a TV camera with a CCD image sensor and the device for detecting the distance information such as the position sensitive detector, an increase in size and cost of the whole apparatus also becomes a problem.

SUMMARY OF THE INVENTION

Therefore, a primary concern of the present invention is to provide an image processing device having the capability of generating both of a distance image and a gray image by irradiating a light intensity-modulated at a modulation frequency to a target space, and receiving the light reflected from an object in the target space.

That is, the image processing device of the present invention comprises:

a light source configured to irradiate a light intensity-modulated at a modulation frequency to a target space;

a light receiving element such as photoelectric converter configured to receive the light reflected from an object in the target space and generate an electrical output corresponding to an intensity of the received light; and an image generator configured to generate a distance image having pixel values, each of which provides a distance value between the object and the image processing device, in accordance with a phase difference between the light emitted from the light source and the light received by the light receiving element, and a gray image having pixel values, each of which provides a gray value of the object, in accordance with the intensity of the received light.

According to the present invention, the gray image and the distance image of the object can be obtained from the electrical output corresponding to the intensity of the light received by the light receiving element at a time. In addition, since each of the gray values of the gray image and a corresponding distance value of the distance image are obtained from the same pixel, no treatment of associating each of positions in the gray image with the corresponding distance value is needed. Consequently, it is possible to obtain a greater amount of the spatial information by using both of the gray image and the distance image without performing such a complex associating treatment. Furthermore, as compared with the case of combining a conventional image pickup device for generating only the gray image with a conventional distance measuring device for extracting the distance information, there are another advantages of downsizing the device as a whole, and achieving a cost reduction.

In the present invention, it is preferred that the image processing device further comprises a differentiator configured to generate a distance differential image having pixel values, each of which provides a distance differential value, from the distance image, and a gray differential image having pixel values, each of which provides a gray differential value, from the gray image, and an outline extractor configured to extract an outline of the object by use of the distance differential image and the gray differential image. In this case, it is possible to reduce amounts of noises, and clearly extract the outline of the object, as compared with the case of using only the gray image.

It is further preferred that the image generator generates the gray image in a time-series manner, and the image processing device further comprises a differentiator configured to generate a gray differential image having pixel values, each of which provides a gray differential value, from the gray image, and an object detector configured to detect the object by use of the gray differential value and the distance value. In this case, a region with a large difference in contrast can be easily separated from another region with a relatively small difference in contrast in the target space. Therefore, it is effective to extract the outline of the object under a high contrast condition between the object and the background in the target space. In addition, the outline of the object within a desired distance range can be obtained from the distance values of the distance image corresponding to the region extracted by the using the gray differential image.

It is also preferred that the object detector generates a difference image between a pair of gray differential images, which are generated from two gray images obtained at different times, extracts a region where each of pixel values is not smaller than a threshold value in the difference image, and then detects the region as the object when a representative value of the pixel values of the distance image corresponding to the region is within a predetermined range. In this case, only a region where a brightness change occurs in the target space can be extracted. In addition, since the region where each of the pixel values is smaller than the threshold value is removed, a region of the object traveled between the different times at which the two gray images are generated can be extracted. Furthermore, it is possible to accurately separate the object region from the background depending on the distance by use of the difference image derived from the gray images and the distance image.

In addition, it is preferred that the object detector generates a plurality of difference images, each of which is a difference between two of at least three gray differential images generated from at least three gray images obtained at different times, extracts a region(s) where each of pixel values is not smaller than a threshold value with respect to each of the difference images to obtain binary images, performs a logical operation between each of pixel values of one of the binary images and a corresponding pixel value of another one of the binary images to extract a common region therebetween, and detects the common region as the object when a representative value of the pixel values of the distance image corresponding to the common region is within a predetermined range. In this case, there is an advantage of extracting a silhouette of the object traveling in the target space, while almost removing the background. Moreover, it is possible to accurately separate the object region from the background depending on the distance by use of the difference images derived from the gray images and the distance image.

As a preferred embodiment of the present invention, the image processing device further comprises a measuring-point determining unit configured to determine a plurality of measuring points on the object in the gray image generated by the image generator; and a distance calculator configured to calculate an actual distance between two of the measuring points on the object by use of the distance value of the pixel corresponding to each of the measuring points in the distance image generated by the image generator. In this case, it is possible to easily determine the actual size of a required portion of the object, as compared with the case of combining the conventional image pickup device for generating only the gray image with the conventional distance measuring device for extracting the distance information, and then performing the treatment of associating each of positions in the gray image with the corresponding distance value.

As a further preferred embodiment of the present invention, the image processing device further comprising a shape estimating unit configured to estimate a 3D model of the object from at least one of the distance image and the gray image generated by the image generator, and a volume estimating unit configured to estimate a volume of the object in accordance with outputs of the shape estimating and the distance calculator described above. In particular, when a monitor for displaying the gray image generated by the image generator is provided, and the measuring-point determining unit comprises a position designator configured to allow a user to appoint desired measuring points on the object displayed on the monitor by touching a screen of the monitor, the actual distance between two of the desired measuring points appointed by the position designator can be calculated by the distance calculator. In this image processing device, even though the light receiving element receives the light reflected by a three-dimensional object from only one direction, the 3D information such as shape and volume of the object can be relatively accurately estimated by using both of the distance image and the gray image. In addition, the actual size of a desired portion of the object can be easily calculated.

As another preferred embodiment of the present invention, the image processing device further comprises an object extractor configured to extract the object having a predetermined shape from the gray image generated by the image generator, and the measuring-point determining unit determines a plurality of measuring points on the object extracted by the object extractor, and the distance calculator calculates the actual distance between two of the determined measuring points. In this case, since it is not needed to allow the user to designate the measuring points, the actual size of the predetermined portion of the object can be automatically calculated. In addition, it is possible to reduce variations in measurement results of the actual size, as compared with the case that the measuring points are designated every time by the user.

As another preferred embodiment of the present invention, the image processing device further comprises a reference-pixel detector configured to detect, as a reference pixel, the pixel having a minimum distance value in a predetermined region in the distance image; a pixel extractor configured to set a specific region including the reference pixel in the distance image, and extract a group of pixels each having the distance value within a predetermined range from the specific region; and an exposure controller configured to control a sensitivity of the light receiving element in accordance with the gray image having the pixels, each of which has a one-to-one correspondence with one of the pixels extracted by the pixel extractor. In this case, the light receiving element can be automatically controlled to a correct exposure irrespective of the brightness of the target space or the background of the object. Therefore, this image processing device is preferably used for a TV interphone.

These and additional objects and advantages of the present invention will become more apparent from the best mode for carrying out the invention explained below, referring to the attached drawings.

BRIEF EXPLANATION OF THE DRAWINGS

In FIGS. 2A to 2C, FIG. 2A is a diagram illustrating a Time-of-Flight method, and FIGS. 2B and 2C show timings of applying a control voltage to an electrode(s) of a light receiving element;

FIGS. 3A and 3B are schematic cross-sectional views illustrating a sensitivity control method of the light receiving element;

FIGS. 7A and 7B are schematic diagrams illustrating of another charge generation and holding operations of the image processing device;

BEST MODE FOR CARRYING OUT THE INVENTION

First Embodiment

Figure 1:
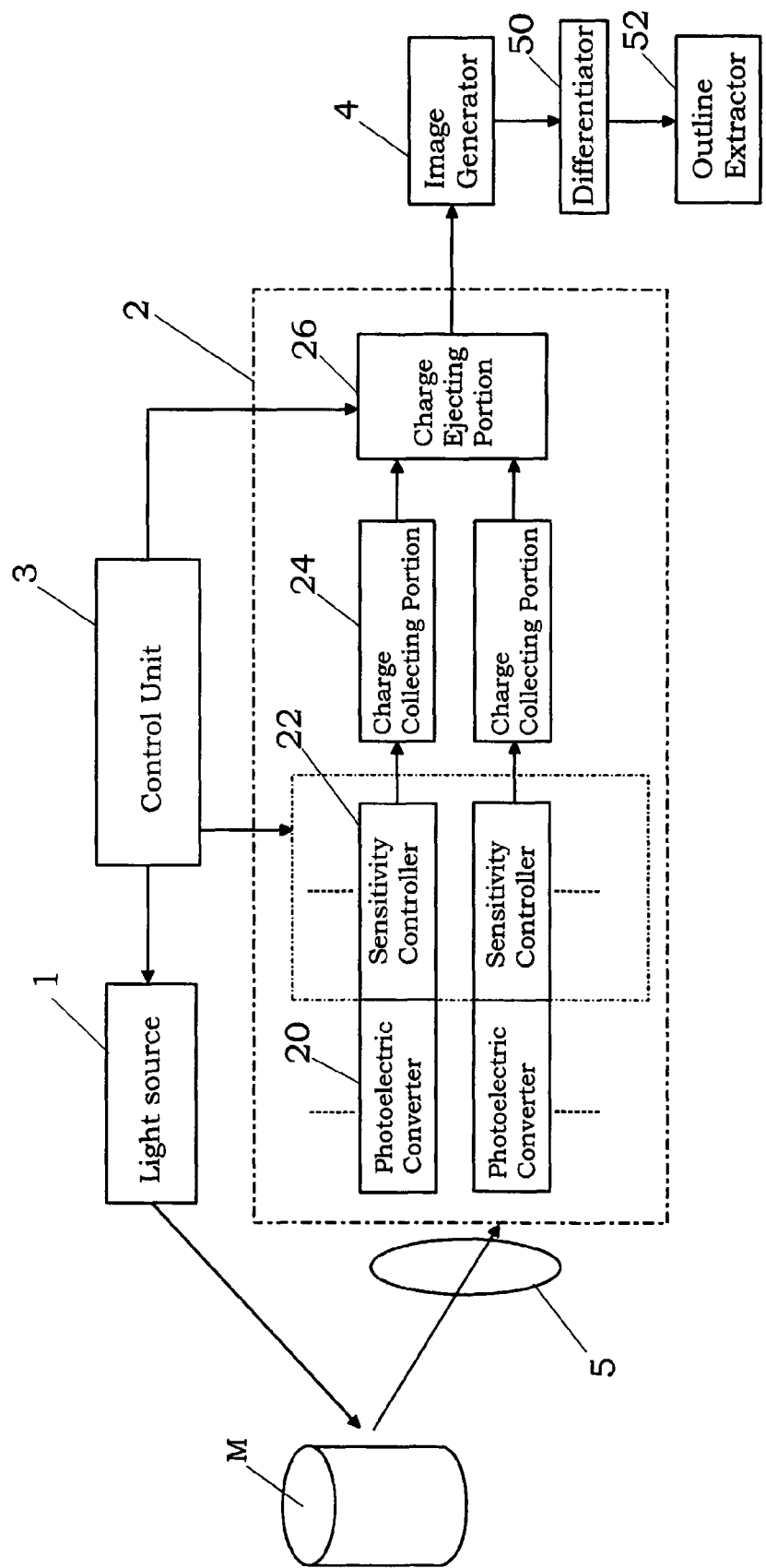
FIG. 1 is a block diagram of an image processing device according to a first embodiment of the present invention.

As shown in FIG. 1, an image processing device of the present embodiment comprises a light source 1 for irradiating a light into a target space, light receiving element 2 for receiving the light reflected from an object M such human in the target space, control unit 3 for the light receiving element, image generator 4 for generating a distance image and a gray image from an output of the light receiving element 2, differentiator 50 for generating a distance differential image from the distance image and a gray differential image from the gray image, and an outline extractor 52 for extracting an outline of the object M by use of the distance differential image and the gray differential image.

The present invention is based on the premise that a distance between the light source 1 and the object M is determined from a time of flight, which is defined a time period elapsed between the irradiation of the light from the light source and the reception of the light reflected from the object by the light receiving element 2. Since the time of flight is extremely short, a light intensity-modulated at a required modulation frequency is irradiated from the light source 1. Therefore, the distance can be determined by using a phase difference between the intensity-modulated light emitted from the light source 1 and the light received by the light receiving element 2.

The "Time-of-flight" method is described in U.S. Pat. No. 5,656,667 and PCT Gazette No. WO03/085413. Therefore, the principle is briefly explained in the present specification. For example, as shown in FIG. 2, when an intensity of the light emitted from the light source 1 changes, as shown by the curve "S1", and the intensity of the light received by light receiving element 2 changes, as shown by the curve "S2", the intensity of the received light can be detected at each of four different phases (0°, 90°, 180°, 270°) to obtain four intensities (A0, A1, A2, A3). Since it is impossible to detect the intensity of light received at just the moment of the each of the phases (0°, 90°, 180°, 270°), each of the intensities (A0, A1, A2, A3) practically corresponds to the intensity of the light received within a short time width "Tw". On the assumption that the phase difference "ψ" does not change within the modulation period, and there is no change in light extinction ratio in the time period between the irradiation of the light from the light source 1 and the reception of the light reflected from the object M, the phase difference "ψ" can be represented by the following equation (1):

$$\Psi = \tan^{-1}\{(A2-A0)/(A1-A3)\} \quad (1)$$

In the present invention, the intensities of the received light may be detected at different phases other than the four different phases (0°, 90°, 180°, 270°) spaced from each other by 90 degrees.

As the light source 1, for example, an array of light emitting diodes (LED) or a combination of a semiconductor laser and a divergent lens can be used. The light source 1 is driven by a modulation signal with a required modulation frequency, which is provided from the control unit 3, to emit the light intensity-modulated by the modulation signal. As an example, the light intensity-modulated by a sine wave of 20 MHz is irradiated to the target space. Alternatively, the intensity-modulation may be performed by use of another waveform such as a triangular wave or a saw-tooth wave.

The light receiving device 2 is composed of a plurality of photoelectric converters 20, each of which receives the light reflected from the object in the target space at a light receiving surface, and generates amounts of electric charges corresponding to the intensity of the received light, sensitivity controller 22 for controlling the sensitivity of each of the photoelectric converters, charge collecting portion 24 for collecting at least part of the electric charges generated by the photoelectric converter, and a charge ejecting portion 26 for outputting the electric charges from the charge collecting portion. In the present embodiment, the amounts of the received light (A0, A1, A2, A3) are determined at the four timings synchronized with a change in intensity of the light emitted from the light source 1 to obtain the distance between the image processing device and the object. These timings are controlled by the control unit 3, as described later. Due to small amounts of electric charges generated by each of the photoelectric converters 20 in one cycle of the intensity change of the light emitted from the light source, it is preferred that the electric charges are collected in plural cycles of the intensity change of the emitted light. For example, the photoelectric converters 20, sensitivity controllers 22 and the charge collecting portions 24 are provided as a single semiconductor device. The charge ejecting portion 26 may have a substantially same structure as a vertical transfer portion or a horizontal transfer portion of a conventional CCD image sensor.

The intensity-modulated light is reflected by the object M, and then the reflected light is incident on the photoelectric converters 22 through a required optical system 5. As shown in FIGS. 3A and 3B, each of the photoelectric converters 20 is composed of a doped semiconductor layer 11 and, an insulating film 12 such as an oxide film formed on a general surface of the doped semiconductor layer 11. A plurality of control electrodes 13 are formed on the doped semiconductor layer 11 through the insulating film 12. For example, a matrix arrangement of 100×100 photoelectric converters 22 can be used as an image sensor.

Figure 4:
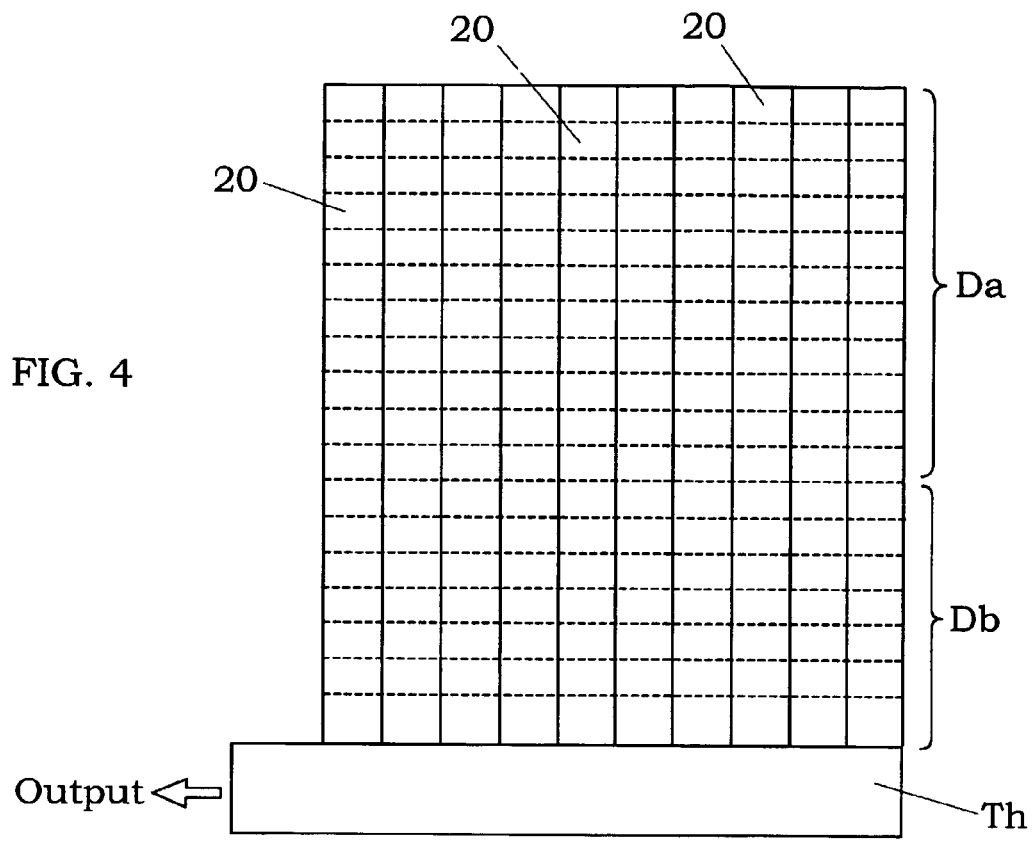
FIG. 4 is a plan view of the light receiving element.

This type of the light receiving element 2 can be obtained by forming a matrix pattern of the photoelectric converters 20 in a single semiconductor substrate. In each column of the matrix pattern of the photoelectric converters 20, the doped semiconductor layer 11 is commonly used as a vertical transfer portion to transfer the electric charges (electrons "e") in the columnar direction. On the other hand, the electric charges provided from an end of the semiconductor layer 11 of each column of the matrix pattern are transferred in the row direction through a horizontal transfer portion. For example, as shown in FIG. 4, the light receiving element 2 has an image pickup portion Da formed by the matrix pattern of the photoelectric converters 20 and an accumulating portion Db with light shielding disposed adjacent to the image pickup region Da. The electric charges collected in the accumulating portion Db are transferred into the horizontal transfer portion Th. The charge ejecting portion 26 includes a function of transferring the electric charges in the vertical direction as well as the horizontal transfer portion Th. The charge collecting portion 24 described above means the function of collecting the electric charges in the image pickup region Da, but not the accumulating portion Db. In other words, the accumulating portion Db belongs to the charge ejecting portion 26. These vertical and horizontal transfer portions are similar to configurations of the conventional frame transfer (FT) CCD image sensor. Therefore, further detailed explanation is omitted.

The optical system 5, through which the light reflected from the object M is incident on the light receiving element 2, determines a visual axis connecting between each of the photoelectric converters 20 and a corresponding point on the object. Generally, the optical system 5 is formed such that a light axis is orthogonal to a plane of the matrix arrangement of the photoelectric converters 20. For example, when a center of the optical system 50 is defined as an original point, and an orthogonal coordinate system is set by vertical and horizontal directions in the plane and the light axis, the optical system is designed such that an angle (i.e., azimuth angle and elevation angle) obtained by describing a position on the object M in the target space with a spherical coordinate corresponds to each of the photoelectric converters 20. Therefore, when the light reflected from the object M is incident on one of the photoelectric converters 20 through the optical system 5, a direction of the visual axis connecting between the photoelectric converter and the corresponding position on the object with respect to the light axis as a reference direction can be determined by use of the position of the photoelectric converter 20.

The light receiving device 2 with the above-described structure is known as a MIS (Metal-Insulator-Semiconductor) device. However, the light receiving device 2 of this embodiment is different from the conventional MIS device in that a plurality of control electrodes 13 (for example, five control electrodes shown in FIG. 3A) are formed on each of the photoelectric converters 20. The insulating film 12 and the control electrodes 13 are made of a translucent material. When a light is incident on the doped semiconductor layer 11 through the insulating film 12, electric charges are generated in the doped semiconductor layer 11. The doped semiconductor layer 11 shown in FIG. 3A is an n-type semiconductor layer. Therefore, the generated electric charges are electrons (e).

According to the sensitivity controller 22 of this embodiment, the amounts of the electric charges generated by the photoelectric converter 20 can be controlled by changing an area of a light receiving region of the photoelectric converter (i.e., light receiving area). For example, when a control voltage (+V) is applied to three of the five control electrodes 13, as shown in FIG. 3A, a potential well (depletion layer) 14 is formed over a region corresponding to the three control electrodes in the doped semiconductor layer 11, as shown by the dotted line in FIG. 3A. When the light is incident on the photoelectric converter 20 having the formed potential well 14, parts of electrons generated in the doped semiconductor layer 11 are captured in the potential well, and the balance of the generated electrons are lost by direct recombination with holes at a deep portion of the doped semiconductor layer 11.

On the other hand, when the control voltage (+V) is applied to the center one of the five control electrodes 13, the potential well 14 is formed over a region corresponding to the one electrode in the doped semiconductor layer 11, as shown by the dotted line in FIG. 3B. Since a depth of the potential well 14 of FIG. 3A is equal to the depth of the potential well 14 of FIG. 3B, the size of the potential well of FIG. 3A is larger than that of the potential well of FIG. 3B. Therefore, when the same light amount is supplied into each of the light receiving devices 2 of FIGS. 3A and 3B, the potential well of FIG. 3A can output larger amounts of electric charges as signal charges. This means that the light receiving element 2 has a higher sensitivity under the condition of FIG. 3A, as compared with the case of FIG. 3B.

Thus, by changing the number of the control electrodes 13, to which the control voltage is applied, a size of the potential well 14 in a direction along the general surface of the doped semiconductor layer 11 (in other words, the size of the charge collecting portion 24 in the light receiving surface) can be controlled to achieve a desired sensitivity of the light receiving element 2.

Alternatively, the sensitivity of the light receiving element 2 may be controlled by changing a ratio of amounts of the electric charges given to the charge collecting portion 24 relative to the amounts of electric charges generated by the photoelectric converter 20, as disclosed in PCT Gazette WO03/085413. In the case of using this control method, it is preferred to perform one of techniques of controlling only a flow of the electric charges from the photoelectric converter 20 to the charge collecting portion 24, controlling only a flow of electric charges from the photoelectric converter to a charge discarding portion, and controlling both of these flows of the electric charges. As an example, the case of controlling the flows of electric charges from the photoelectric converter to the charge collecting portion and the charge discarding portion is explained below.

Figure 5:
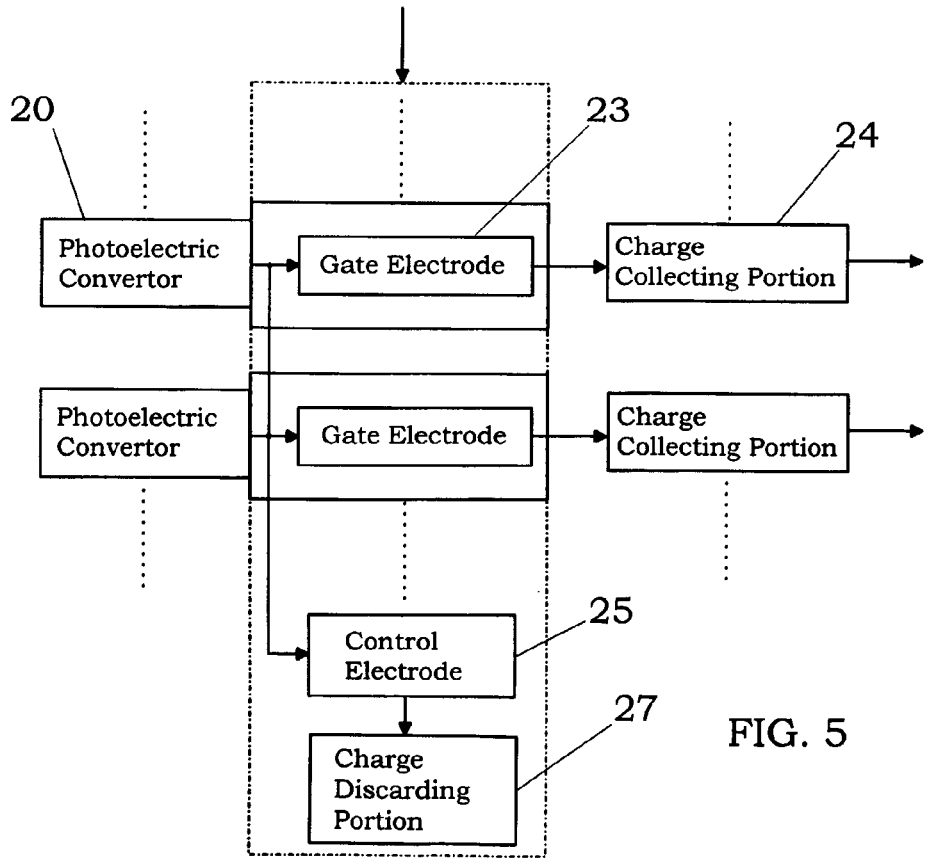
FIG. 5 is a block diagram illustrating another light receiving element.

As shown in FIG. 5, the light receiving element 2 used in this control method has a gate electrode 23 formed between each of the photoelectric converters 20 and a corresponding charge collecting portion 24, and a charge discarding portion 27 commonly used by the photoelectric converters 20. By changing a first control voltage applied to the gate electrode 23, amounts of the electric charges traveling from one of the photoelectric converters 20 to the corresponding charge collecting portion 24 can be controlled. In addition, amounts of electric charges traveling from one of the photoelectric converters 20 to the charge discarding portion 27 can be controlled by changing a second control voltage applied to a control electrode 25 for the charge discarding portion 27. In this case, for example, an interline transfer (IT) type, frame transfer (FT) type, or frame interline transfer (FIT) type CCD image sensor having an overflow drain can be used as the light receiving element 2 with the sensitivity controller 22.

Figure 6A:
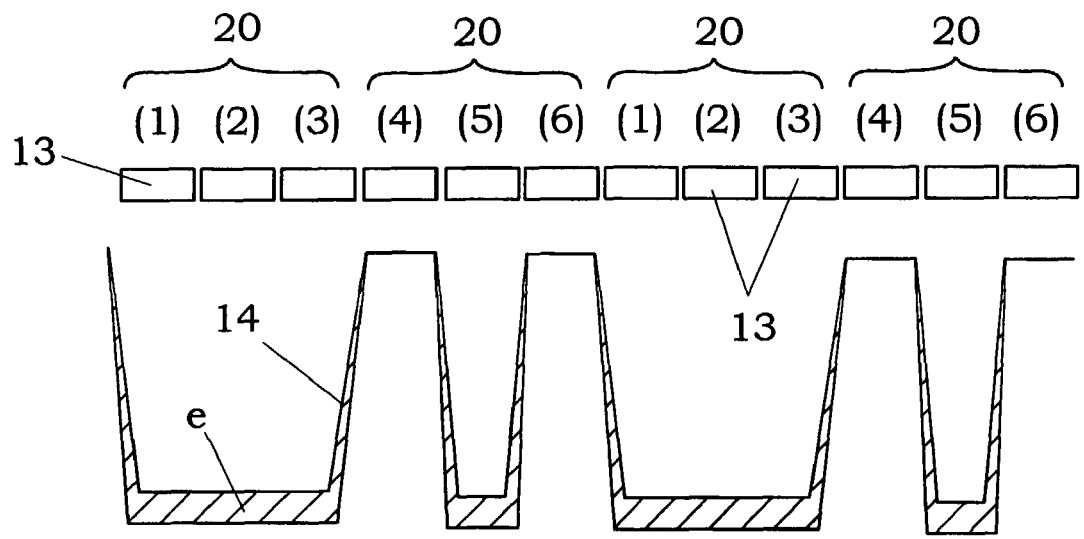
FIGS. 6A and 6B are schematic diagrams illustrating charge generation and holding operations of the image processing device.
Figure 6B:
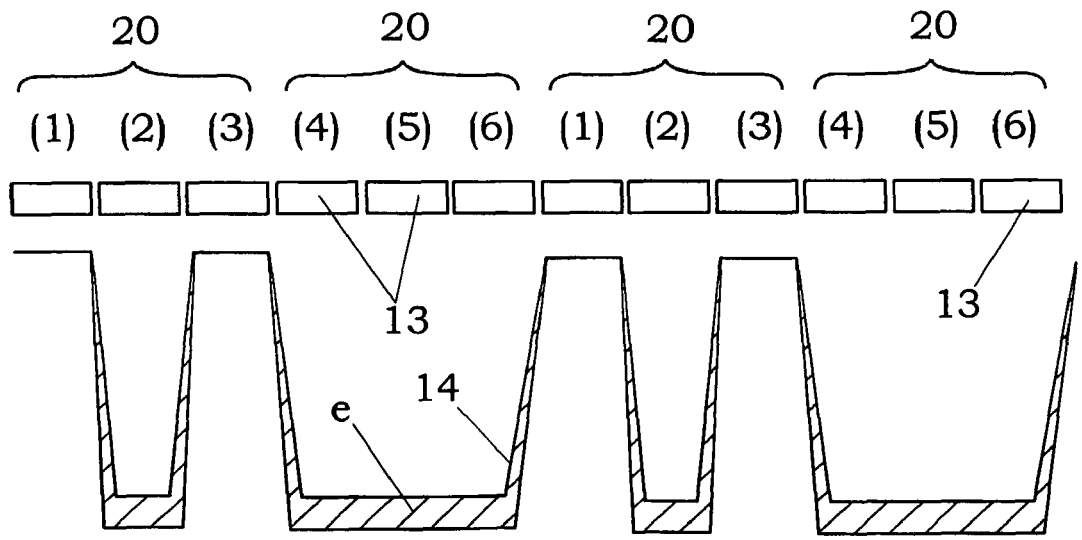

Next, a method of determining the four intensities (A0, A1, A2, A3) of the received light by controlling the sensitivity of the photoelectric converters 20 to obtain the distance information with the object M is explained. As described above, the control unit 3 controls the control voltage applied to the control electrodes 13 to change the area of the potential well 14 formed in the photoelectric converter 20, i.e., the size of the charge collecting portion 24. In the following explanation, as shown in FIGS. 6A and 6B, six control electrodes 13 for a pair of photoelectric converters 20 providing one pixel are numbered as (1) to (6). Therefore, one of the pair of photoelectric converters 20 has the control electrodes (1) to (3), and the other one has the control electrodes (4) to (6).

For example, electric charges corresponding to each of the intensities (A0, A2) of the received light can be alternately generated by use of the pair of photoelectric converters 20 providing one pixel. In the case of generating the electric charges corresponding to the intensity (A0), the potential well 14 having the large area can be obtained by applying a constant control voltage to all of the control electrodes (1) to (3) of one of the photoelectric converters 20, as shown in FIG. 6A At this time, with respect to the other photoelectric converter 20, the control voltage is applied to only the center electrode (5) of the control electrodes (4) to (6) to obtain the potential well 14 having the small area. The large potential well 14 formed in the photoelectric converter 20 having the control electrodes (1) to (3) is in a charge generation period with a high sensitivity state, and the small potential well 14 formed in the other photoelectric converter 20 having the control electrodes (4) to (6) is in a charge holding period with a low sensitivity state. Under this condition, the electric charges corresponding to the intensity (A0) can be collected in the large potential well 14 of the photoelectric converter having the control electrodes (1) to (3).

On the other hand, when generating the electric charges corresponding to the intensity (A2), the potential well 14 having the large area can be obtained by applying the constant control voltage to all of the electrodes (4) to (6) of one of the photoelectric converters 20, as shown in FIG. 6B. At this time, with respect to the other photoelectric converter 20, the control voltage is applied to only the center electrode (2) of the control electrodes (1) to (3) to obtain the potential well 14 having the small area. The large potential well 14 formed in the photoelectric converter 20 having the control electrodes (4) to (6) is in a charge generation period with a high sensitivity state, and the small potential well 14 formed in the other photoelectric converter 20 having the control electrodes (1) to (3) is in a charge holding period with a low sensitivity state. Under this condition, the electric charges corresponding to the intensity (A2) can be collected in the large potential well 14 of the photoelectric converter 20 having the control electrodes (4) to (6). Thus, by alternately repeating the formation of the large potential well 14 in the photoelectric converter 20 having the control electrodes (1) to (3) and the formation of the large potential well 14 in the photoelectric converter 20 having the control electrodes (4) to (6), the electric charges corresponding to each of the intensities (A0, A2) of the received light can be obtained.

The timing of applying the control voltage to the control electrodes to generate the electric charges corresponding to each of the intensities (A0) and (A2) are shown in FIGS. 2B and 2C, in which a hatching region designates that the control voltage is applied to the control electrodes. The electric charges corresponding to each of the intensities (A1, A3) of the received light can be alternately generated by use of the pair of the photoelectric converters 20 providing one pixel according to a substantially same method described above except that the timing of applying the control voltage to the control electrodes is shifted by 90 degrees with respect to the phase of the modulation signal. Thus, the control unit 3 controls the timing of applying the control voltage to the control electrodes and the number of control electrodes, to which the control voltage is applied. In other words, to determine the phase difference between the light irradiated from the light source 1 into the target space and the light received by the light receiving element 2, the sensitivity of the light receiving element is controlled at the timing synchronized with the period of the modulation signal for driving the light source 1 by the control unit 3. That is, high and low sensitivity states of the light receiving element 2 are alternately repeated by a repetition cycle synchronized with the period of the modulation signal by the control unit 3.

After the electric charges corresponding to the intensity (A0) are collected in the large potential well 14 shown in FIG. 6A, and the electric charges corresponding to the intensity (A2) are collected in the large potential well 14 shown in FIG. 6B, these electric charges are output from the charge ejecting unit 26. Similarly, the electric charges corresponding to each of the intensities (A1) and (A3) are collected, and then output from the charge ejecting unit 26. Thus, by repeating the above procedures, it is possible to obtain the electric charges corresponding to each of the four intensities (A0, A1, A2, A3) of the received light, and determine the phase difference "ψ" by use of the above equation (1).

It is also preferred that the control voltage applied to the control electrodes 13 in the charge generation period is greater than the control voltage applied to the control electrode(s) in the charge holding period. In this case, as shown in FIGS. 7A and 7B, a depth of the potential well 14 formed in the charge holding period is smaller than the depth of the potential well formed in the charge generation period. For example, the control voltage applied to the three control electrodes (1) to (3) or (4) to (6) to obtain the potential well 14 having the large depth is 7V, and the control voltage applied to only the electrode (2) or (5) to obtain the potential well 14 having the small depth can be 3V. When the potential well 14 for mainly generating the electric charges (electrons "e") has the larger depth than the potential well 14 for holding the electric charges, the electric charges can easily flow in the potential well having the large depth, so that amounts of noises can be relatively reduced.

The electric charges provided from the charge ejecting portion 26 of the light receiving element 2 is sent to the image generator 4. In the image generator 4, a distance between a point of the object M and the image processing device is determined by substituting the intensities (A0, A1, A2, A3) of the received light into the equation (1) with respect to each of the photoelectric converters 20. As a result, 3D information about the target space including the object is obtained. By using the 3D information, a distance image having pixel values, each of which provides a distance value between a point on the object and the image processing device can be generated.

On the other hand, brightness information of the object M can be obtained from the amounts of the electric charges provided from the charge ejecting unit 26 of the light receiving element 2. That is, a sum of the amounts of the light received at each of the photoelectric converters 20 or an average value of the amounts thereof corresponds to a gray value of the point on the object. As a result, a gray image having pixel values, each of which provides the gray value of the point on the object is obtained. In the present embodiment, to minimize the incident of outside light on the light receiving element 2, the light source 1 irradiates an infrared ray to the target space, and an infrared-transparent filter (not shown) is disposed in front of the light receiving element 2. Therefore, the gray image generated by the image processing device of this embodiment is an infrared gray image.

Thus, both of the distance value between the point on the object and the image processing device and the gray value of the point on the object can be obtained from the same pixel. Therefore, it is possible to obtain the distance image and the gray image, which are substantially identical in time. In addition, since each of the pixels of the distance image has a one-to-one correspondence with each of the pixels of the gray image, no treatment of associating each of positions in the gray image with corresponding distance information is needed. Moreover, greater spatial information about the object M can be obtained, as compared with the case of using only the gray image.

The distance image and the gray image generated by the image generator 4 are sent to the differentiator 50. In the differentiator 50, a distance differential image having pixel values, each of which provides a distance differential value, is generated from the distance image, and a gray differential image having pixel values, each of which provides a gray differential value is generated from the gray image. Each of the distance differential value and the gray differential value can be determined by using pixel values of a center pixel in a predetermined pixel region and neighbor pixels around the center pixel.

Figures 8, 10:
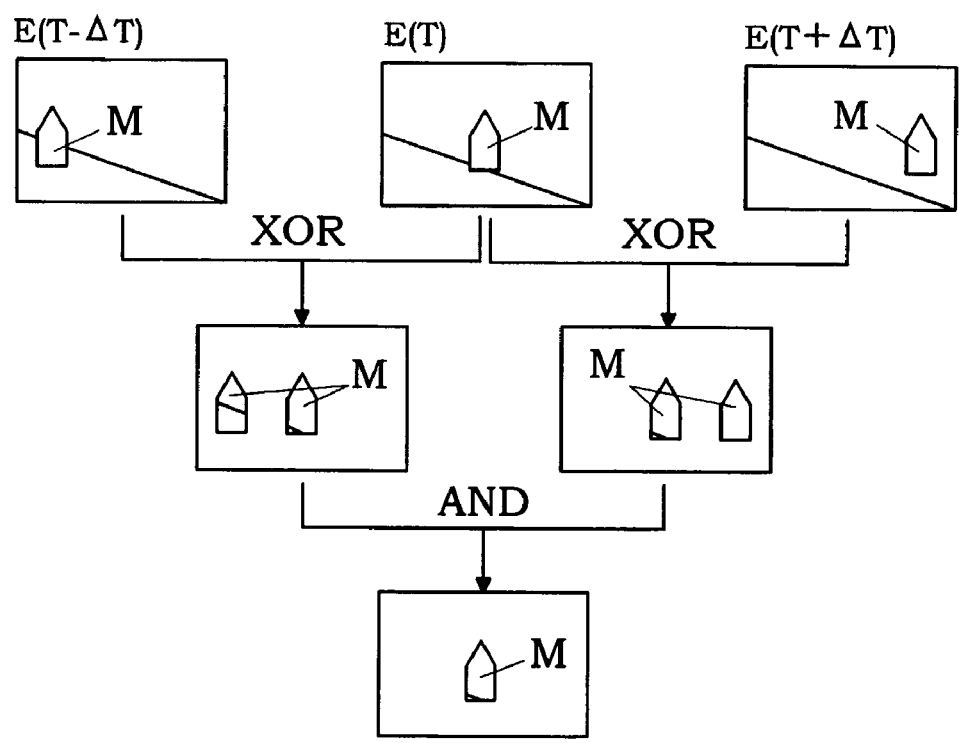
FIG. 8 shows a 3×3 pixel arrangement used to determine a distance differential value.
FIG. 10 is a diagram illustrating a method of extracting an outline of an object traveling in a target space.

For example, as shown in FIG. 8, the distance differential value "Dd" of the center pixel p5 in a 3×3 arrangement of nine pixels (p1~p9) of the distance image is represented by the following equation (2).

$$Dd=(\Delta X^2+\Delta Y^2)^{1/2} \quad (2)$$

"$\Delta X$" and "$\Delta Y$" are respectively obtained by performing the following calculations:

$$\Delta X=(B1+B4+B7)-(B3+B6+B9)$$

$$\Delta Y=(B1+B2+B3)-(B7+B8+B9)$$

Wherein, B1 to B9 are respectively pixel values of the pixels p1 to p9. Similarly, the gray differential value of the center pixel p5 of the gray image can be determined. In the distance differential image, as a distance difference in the distance image increases, the distance differential value becomes larger. Similarly, as a brightness (contrast) difference in the gray image increases, the gray differential value becomes larger.

Then, the distance differential image and the gray differential image are sent to the outline extractor 52 to extract the outline of the object M. In the present invention, it is preferred to extract the outline of the object according to one of the following methods (1) to (5).

(1) A region(s) where the distance differential value maximizes in the distance differential image, and a region(s) where the gray differential value maximizes in the gray differential image are determined, so that those regions are extracted as the outline of the object.

(2) A first region(s) where the distance differential value maximizes in the distance differential image, and a second region(s) where the gray differential value maximizes in the gray differential image are determined, and then a corresponding region(s) between the first region(s) and the second region(s) is extracted as the outline of the object.

(3) At least one of a region(s) where the distance differential value is not smaller than a threshold value in the distance differential image, and a region(s) where the gray differential value is not smaller than a threshold value in the gray differential image is determined, and the region(s) is extracted as the outline of the object.

(4) A first region(s) where the distance differential value is not smaller than a threshold value in the distance differential image, and a second region(s) where the gray differential value is not smaller than a threshold value in the gray differential image are determined, and then a corresponding region(s) between the first region(s) and the second region(s) is extracted as the outline of the object.

(5) A weighted sum of the distance differential value of each of the pixels of the distance differential image and the gray differential value of a corresponding pixel of the gray differential image are determined, and then a region(s) where the weighted sum is not smaller than a threshold is extracted as the outline of the object.

According to the above methods, a one-pixel width region including the outline of the object can be extracted. In addition, according to the method (1) or (3), it is possible to extract the outline of the object with a higher probability. For example, it is effective to extract inner outlines or edges of the object. According to the method (2) or (4), even when there is a region having a large difference in brightness and a large change in distance in the target space, it is possible to accurately extract the outline of the object, while preventing that a noise is extracted as the outline of the object by mistake.

In the methods (3) and (4), it is preferred that the threshold value for the gray differential value is set to be different from the threshold value for the distance differential value. In addition, there is another advantage that the sensitivity of extracting the outline of the object can be controlled by changing a magnitude of the threshold value. In particular, when the region where both of the gray differential value and the distance differential value are not smaller than the threshold values is extracted, a remarkable effect of removing the noise components is obtained. In the method (5), an order of precedence between the distance differential value and the gray differential value can be controlled by adequately setting weights used to determine the weighted sum. For example, when the weight for the distance differential value is set to be relatively larger than the weight for the gray differential value, a region having a large change in distance has a higher priority as the outline of the object than the region having a large change in brightness (concentration). In this case, for example, the outline of the human face can be easily extracted. It is preferred that the image processing device further comprises a selector for perform a desired one from the above methods (1) to (5).

When a brightness difference (gray difference) between the object and the background is small due to influences of outside light and reflection coefficient of the object, there is a case that the outline of the object cannot be accurately extracted by use of only the gray differential image In addition, when the distance difference between the object and the background is small, it becomes difficult to extract the outline of the object from only the distance differential image. However, according to the present invention, since the shortcomings of the distance differential image and the gray differential image are complemented to each other, it is possible to provide the image processing device with an improved detection accuracy of the outline of the object. In addition, since the information obtained from each of the gray differential values and the corresponding distance differential value is the information obtained at the same position on the object from the same pixel, it is possible to prevent an oversight of the outline to be extracted, and remove the noise components with a high degree of reliability.

Second Embodiment

Figure 9:
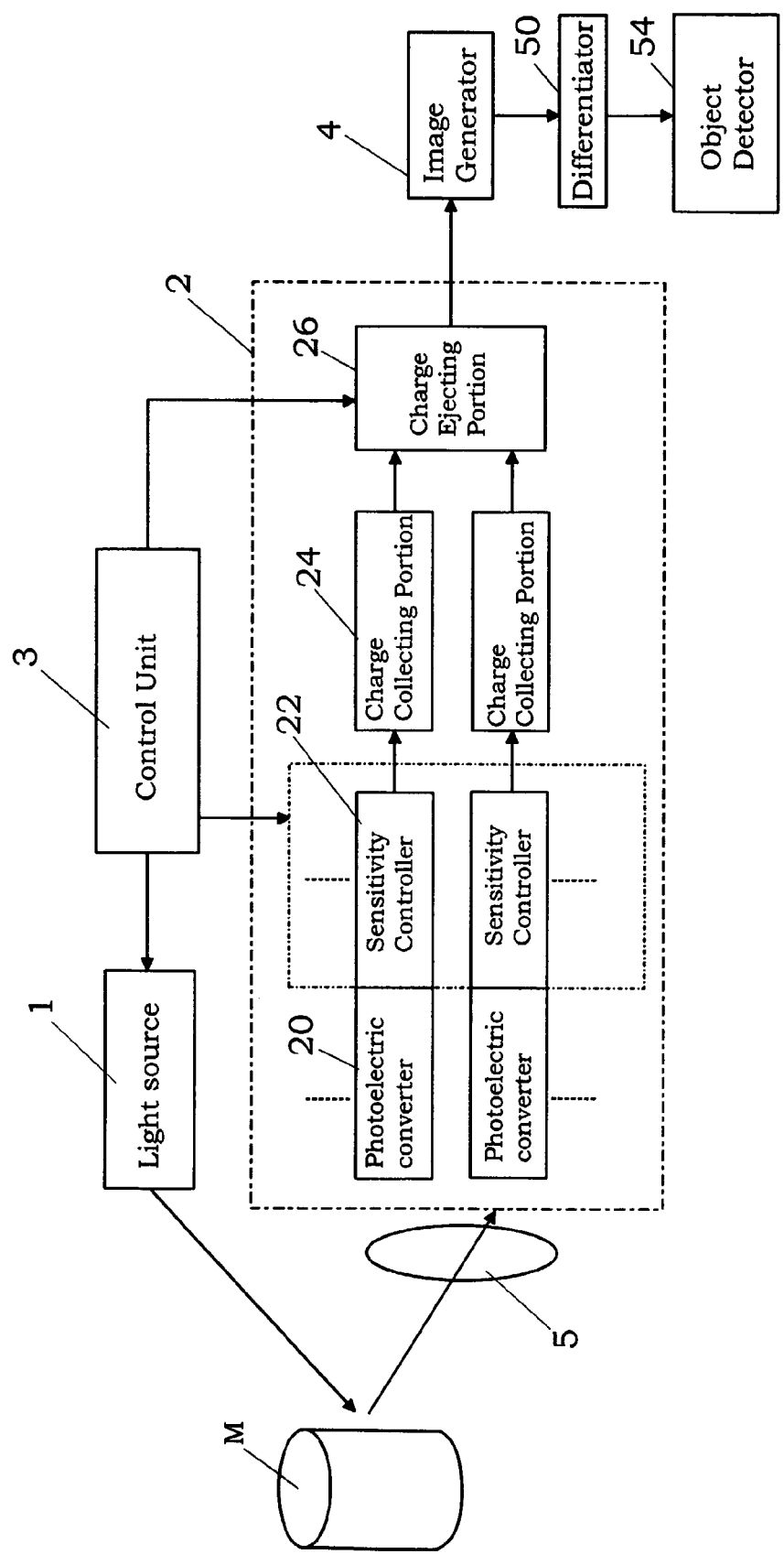
FIG. 9 is a block diagram of an image processing device according to a second embodiment of the present invention.

An image processing device of the second embodiment is substantially the same as the device of the first embodiment except that an object detector 54 is provided in place of the outline extractor 52, as shown in FIG. 9. Therefore, the same components as the components of FIG. 1 are indicated by the same numerals, and duplicate explanations are omitted.

The object detector 54 detects the object M according to the following method with use of an output of the differentiator 50, i.e., a gray differential image. The image generator 4 generates the gray image in a time-series manner. Therefore, a plurality of gray images are obtained at different times. The object detector 54 generates a difference image between a pair of gray differential images, which are generated from two of the gray images, and then extracts a region where each of pixel values is not smaller than a threshold value in the difference image. The thus extracted region corresponds to a region of the object traveled in the target space. By the generation of the difference image, the background is substantially cancelled.

By the way, when a moving body other than the object M exists in the target space, it means that there is a noise component(s) in the difference image. When the noise component(s) exists within a distance range where the object M does not exist, it can be separated according to the following method. That is, a labeling treatment is performed to the regions extracted from the difference image to obtain coupling regions. With respect to each of the coupling regions, an average of the pixel values of the distance image is determined, and then a region where the average is within a predetermined range is extracted as the object. Thus, by extracting a region corresponding to a desired distance range, the noise components can be separated from the object.

To remove the background, the differentiator 50 may previously generate a reference gray differential image from the gray image obtained under a condition that no moving body exist in the target space. In this case, a difference image between the reference gray differential image and a gray differential image obtained at a different time is generated. By extracting the region where the pixel value is not smaller than the threshold value from the difference image, the region of the object M can be easily separated from the background.

In addition, it is preferred that a stationary background other than the object M traveling in the target space is cancelled by the following method. For example, to extract the region corresponding to the object M traveling in the target space, electric charges are provided from the light receiving element 2 such that the gray images are generated at a speed of 30 frames/sec, as in the case of using a conventional TV camera. The gray differential images are generated by the differentiator 50 from the generated gray images, and then the difference image between arbitrarily selected two gray differential images is generated by the object detector 54. When the object M travels at a relatively high speed in the target space, it is preferred to use the gray differential images corresponding to adjacent two frames to generate the difference image.

With respect to each of the pixels of the obtained difference image, which has a change in gray differential value between the gray differential images, a pixel value other than zero is obtained. Therefore, by digitalizing the difference image by use of a predetermined threshold value, it is possible to extract the region where the difference in gray differential value between the pair of the frames used to generate the difference images is not smaller than the threshold value. Such a region corresponds to a region of the object traveled between two different times, at which the gray images were generated. Thus, by deleting the noise components, only the object traveling in the target space can be extracted. In this case, since the object traveling in the target space is extracted from each of the two frames, two regions corresponding to positions of the object at the two different times appears in the digitalized image.

In the above case, the region of the object in one of the frames can not be separated from the region of the object in the other frame. Therefore, when it is needed to extract only the region of the object traveling in the target space at a specific time (i.e., in a specific frame), it is preferred to perform the following treatment with use of at least three frames obtained at different times.

For example, three gray differential images are generated from the gray images obtained at three different times ((T−ΔT), (T), (T+ΔT)). Each of the gray differential images are digitalized by use of a predetermined threshold value, so that three digitized images (E(T−ΔT), E(T), E(T+ΔT)) are generated, as shown in FIG. 10. In each of the digitalized image, a region including the outline of the object M has a pixel value different from the background. In this case, the pixel value of the region including the outline of the object is "1".

In the object detector 54, a difference between adjacent digitalized images E(T−ΔT) and E(T) in the time-series manner is determined. Similarly, a difference between another adjacent digitalized images E(T) and E(T+ΔT) in the time-series manner is determined. To determine these differences, a logic operation EXCLUSIVE OR (XOR) is performed to a pair of each of the pixels of one of the adjacent digitalized images and a corresponding pixel of the other one. As a result, a digitalized differential image are obtained from each of the differences. As shown in FIG. 10, two regions corresponding to positions of the object at the two different times appear in the respective digitalized differential image.

Next, a logic operation AND is performed to a pair of each of the pixels of one of the digitalized differential images and a corresponding pixel of the other digitalized differential image. That is, since the background is substantially cancelled in these digitalized differential images, the region corresponding to the object in the target space at the specific time (T) can be extracted by the logic operation AND. Thus, the result of the logic operation AND provides a silhouette at the specific time (T) of the object traveling in the target space.

Subsequently, a labeling treatment is performed to the region obtained by the logic operation AND to obtain coupling regions. With respect to each of the coupling regions, an average of the pixel values (distance values) of the distance image is determined, and then a region where the average is within a predetermined range is extracted as the object. In addition, the regions existing in out of the predetermined range can be removed as the noise components.

In the case of using more than three gray differential images, the above treatment may be carried out, as described below. For example, when using five gray differential images (1-5) generated from the gray images obtained at five different times, a logic operation AND between the gray differential images (1, 2) is performed to obtain a resultant gray differential image, and then a difference between the resultant gray differential image and the gray differential image (3) is determined. Similarly, the logic operation AND between the gray differential images (4, 5) is also performed to obtain a resultant gray differential image, and then a difference between the resultant gray differential image and the gray differential image (3) is determined. By performing the logic operation AND between these differences, it is possible to obtain the silhouette at the specific time of the object traveling in the target space.

Third Embodiment

An image processing device of the third embodiment is substantially the same as the device of the first embodiment except for the following components. Therefore, the same components as the components shown in FIG. 1 are indicated by the same numerals, and duplicate explanations are omitted.

The image processing device of this embodiment is characterized by comprising an actual-size calculator 62 for determining an actual size of a desired portion of the object by use of the distance image and the gray image generated by the image generator 4, shape estimating unit 64 for estimating a shape of the object M, and a volume estimating unit 66 for estimating a volume of the object.

Figure 11:
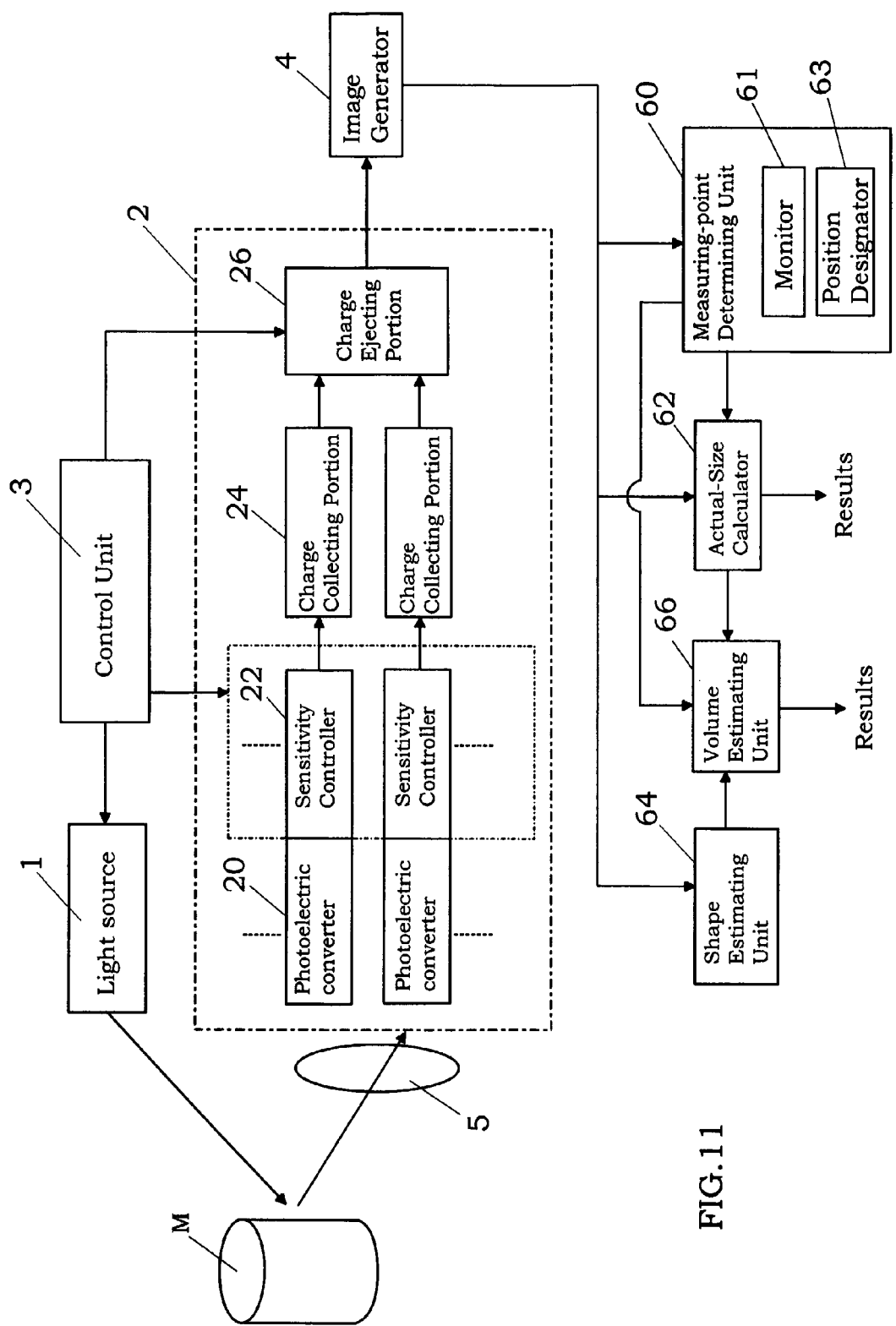
FIG. 11 is a block diagram of an image processing device according to a third embodiment of the present invention.

As shown in FIG. 11, the distance image generated by the image generator 4 is sent to a measuring point determining unit 60. In the measuring-point determining unit 60, a plurality of measuring points are designated in the gray image. The measuring points can be designated in the gray image by the user. For example, it is preferred that the image processing device further comprises a monitor 61 for displaying the gray image, and a position designator 63 for allowing the user to designate the desired measuring points in the gray image displayed on the monitor 60 by touching a screen of the monitor, or by use of a pointing device (not shown) such as a mouse or a keyboard. In this embodiment, the gray image displayed on the monitor 60 is an infrared gray image. As compared with the case of displaying the distance image on the monitor 60 and designating the measuring points in the distance image, positional relations between the object and the measuring points can be easily recognized by the user.

The measuring points may be automatically designated in the gray image. In this case, the image processing device comprises an object extractor configured to extract the object having a predetermined shape from the gray image generated by the image generator 4. Foe example, a position of the object in the gray image can be determined by comparing the whole shape of the object with a template. The measuring-point determining unit 60 automatically designates a plurality of predetermined measuring points in the gray image in response to the shape of the object.

The measuring points designated on the monitor 61 and the distance image generated by the image generator 4 are sent to the actual-size calculator 62. In the actual-size calculator 62, the distance value of the pixel corresponding to the each of the designated measuring points is determined from the distance image. In addition, positions of the measuring points in the distance image are also determined. By using the distance values and the positions of the measuring points, 3D information about the measuring points on the object can be obtained. The actual-size calculator 62 determines the actual distance between two of the desired measuring points by use of the obtained 3D information. The obtained actual size is displayed on the monitor 61. In addition, it is preferred that the obtained actual size is displayed by a straight line on the monitor. In the case of using the object extractor described above, the actual-size calculator 62 automatically calculates the actual distance between two of the predetermined measuring points.

When at least three measuring points are designated, it is preferred that plural pairs of adjacent measuring points are automatically set in the order of the designation, and the actual-size calculator 62 successively calculates the actual size with regard to each of the pairs of adjacent measuring points. For example, when three measuring points (m1, m2, m3) are designated, the actual-size calculator 62 successively calculates the actual sizes between the measuring points (m1, m2) and between the measuring points (m2, m3). In addition, when a plurality of measuring points are designated along the outline of the object, it is preferred that the measuring points corresponding to the maximum width or the minimum width of the object are selected, and the actual-size calculator 62 calculates the actual size between the selected measuring points. In addition, when an outline of the object M is extracted by use of at least one of the gray image and the distance image, and the measuring points are designated within a predetermined distance range from the outline of the object, a treatment of replacing the measuring points on the outline of the object may be performed. For example, the outline of the object can be extracted by use of the outline extractor 52 explained in the first embodiment.

The shape estimating unit 64 is configured to estimate 3D information about a shape or an orientation of the object from at least one of the distance image and the gray image generated by the image generator 4. That is, at least one of the distance image and the gray image is input into the shape estimating unit 64, and then edges (=outline) of the object are extracted. As described in the first embodiment, the extraction of the edges is achieved by performing a differential treatment to the distance image or the gray image, and then digitalizing. As the differential treatment, for example, an edge filter such as SOBEL filter can be used. The extracted edges are compared with a data base storing 3D information of given objects to determine as to whether they are components constructing the object.

In addition, when a plurality of candidates of the object exist in a predetermined distance range, it is preferred to determine whether the object is integrally formed by those candidates. For example, when a distance difference between adjacent two candidates in the three dimensional space is not larger than a threshold value, these candidates are determined as components constructing a single object. By using the number of pixels in a region surrounded by the candidates constructing the single object and the distance value, the size of the object can be estimated.

The volume estimator 66 is configured to estimate a volume of the object M in accordance with outputs of the shape estimating unit 64 and the actual-size calculator 62. In particular, it is preferred that the measuring points are designated in the gray image, and a volume of a portion of the object defined by the designated measuring points is estimated by the volume estimating unit 66.

Fourth Embodiment

In this embodiment, a TV interphone using an image processing device of the present invention as an image pick-up camera is explained. The image processing device is substantially the same as the device of the first embodiment except for the following components. Therefore, the same components as the components shown in FIG. 1 are indicated by the same numerals, and duplicate explanations are omitted.

Figure 12:
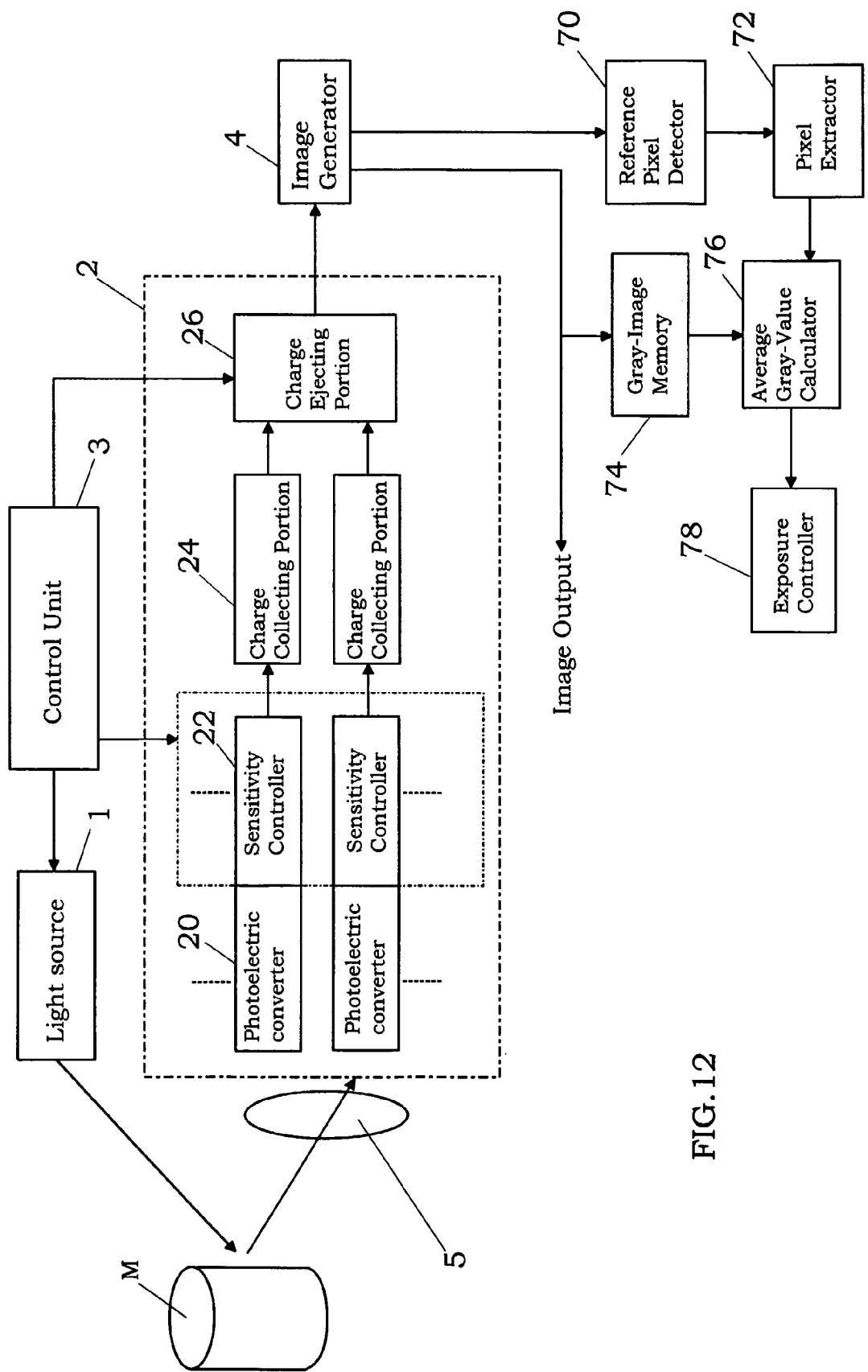
FIG. 12 is a block diagram of an image processing device according to a fourth embodiment of the present invention.

That is, as shown in FIG. 12, the image processing device of this embodiment is characterized by comprising a reference-pixel detector 70 configured to detect, as a reference pixel, a pixel having a minimum distance value in a predetermined region in the distance image, and a pixel extractor 72 configured to set a specific region including the reference pixel in the distance image, and extract a plurality of pixels each having a distance value within a predetermined range from the specific region.

Figure 13:
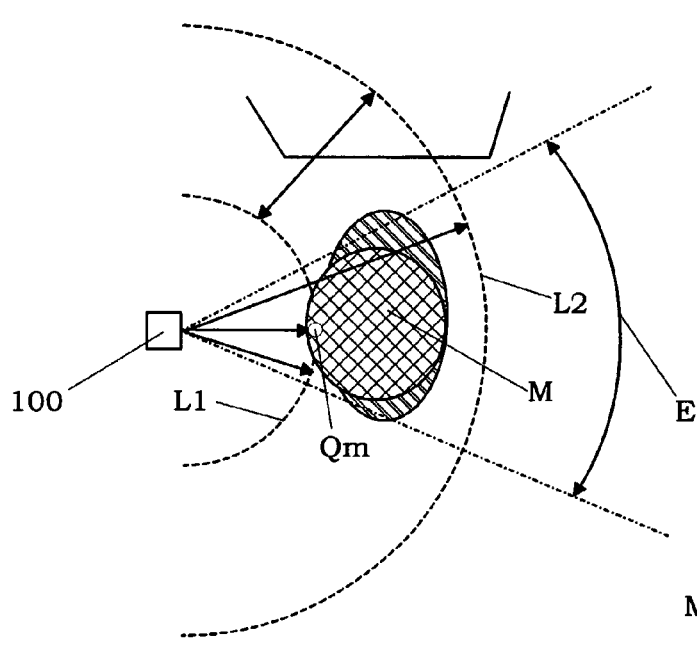
FIG. 13 is a schematic diagram illustrating an operation of the image processing device.
Figure 14A:
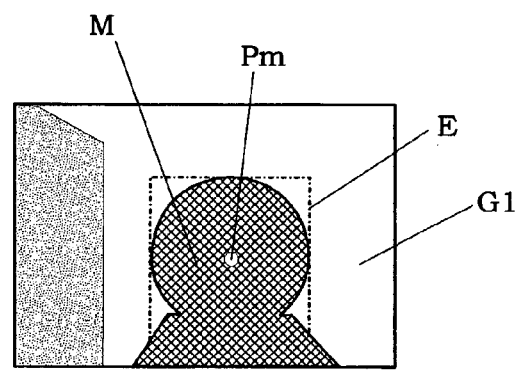
FIGS. 14A and 14B are schematic diagrams of distance images of an object generated by the image processing device.

For example, in FIG. 13, "E" designates a region defined by two dashed lines extending from the TV interphone 100. A distance image G1 of the region E including the object M such as human can be generated by the image generator 4, as shown in FIG. 14A In addition, "Qm" designate a point providing a minimum distance between the TV interphone 100 and the object M. A pixel Pm corresponding to the point Qm in the distance image G1 is detected as the reference pixel.

Figure 14B:
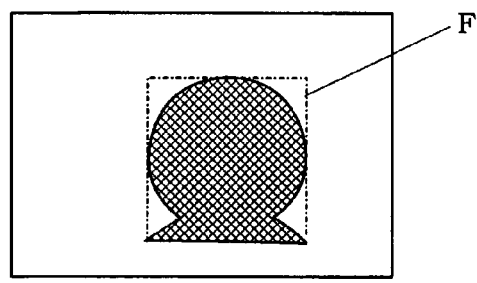

Next, as shown in FIG. 14B, a specific region F is set in the distance image by use of the reference pixel Pm and the pixels each having the distance value within the predetermined distance range extracted by the pixel extractor 72. For example, the pixels each having the distance value within the distance range defined between two dotted arcuate lines L1 and L2 in FIG. 13 are extracted by the pixel extractor 72. In FIG. 14B, the pixels extracted by the pixel extractor 72 are shown by a hatching region. When a lower limit of the predetermined distance range is the distance value of the reference pixel Pm, and a value obtained by adding a required value (e.g., 10 cm) to the distance value of the reference value Pm is determined as an upper limit thereof, the object concerning the reference pixel (i.e., the object positioned at a minimum distance with the TV interphone) can be extracted.

In addition, as shown in FIG. 12, the image processing device of this embodiment is characterized by further comprising a gray-image memory 74 for storing the gray image generated by the image generator 4, average gray-value calculator 76 configured to read out the gray image from the gray-image memory 74, and calculate an average gray value of the pixels of the gray image, each of which has the one-to-one correspondence with one of the pixels extracted by the pixel extractor 72, and an exposure controller 78 configured to control an exposure of the light receiving element 2 in accordance with the obtained average gray value.

The exposure controller 78 controls an output of the light source 1 or the sensitivity controllers 22 of the light receiving element 2 through the control unit 3, to provide an adequate exposure of the image processing device. The reference-pixel detector 70, pixel extractor 72, average gray-value calculator 76 and the exposure controller 78 can be actualized by installing a required software in a microcomputer. According to the image processing device of this embodiment, the exposure can be automatically controlled to correct exposure irrespective of brightness of the target space or the condition of the background to clearly identify the object. Therefore, it is possible to provide the TV interphone with an improved security performance.

As a modification of the above embodiment, a color image-pickup device such as color CCD may be used as the image pickup camera. In this case, a color image is displayed on a TV monitor of the interphone, and the image processing device described above is used to control the exposure of the color image pickup device.

Fifth Embodiment

In this embodiment, a TV interphone using an image processing device of the present invention as an image pick-up camera is explained. The image processing device is substantially the same as the device of the first embodiment except for the following components. Therefore, the same components as the components shown in FIG. 1 are indicated by the same numerals, and duplicate explanations are omitted.

Figure 15:
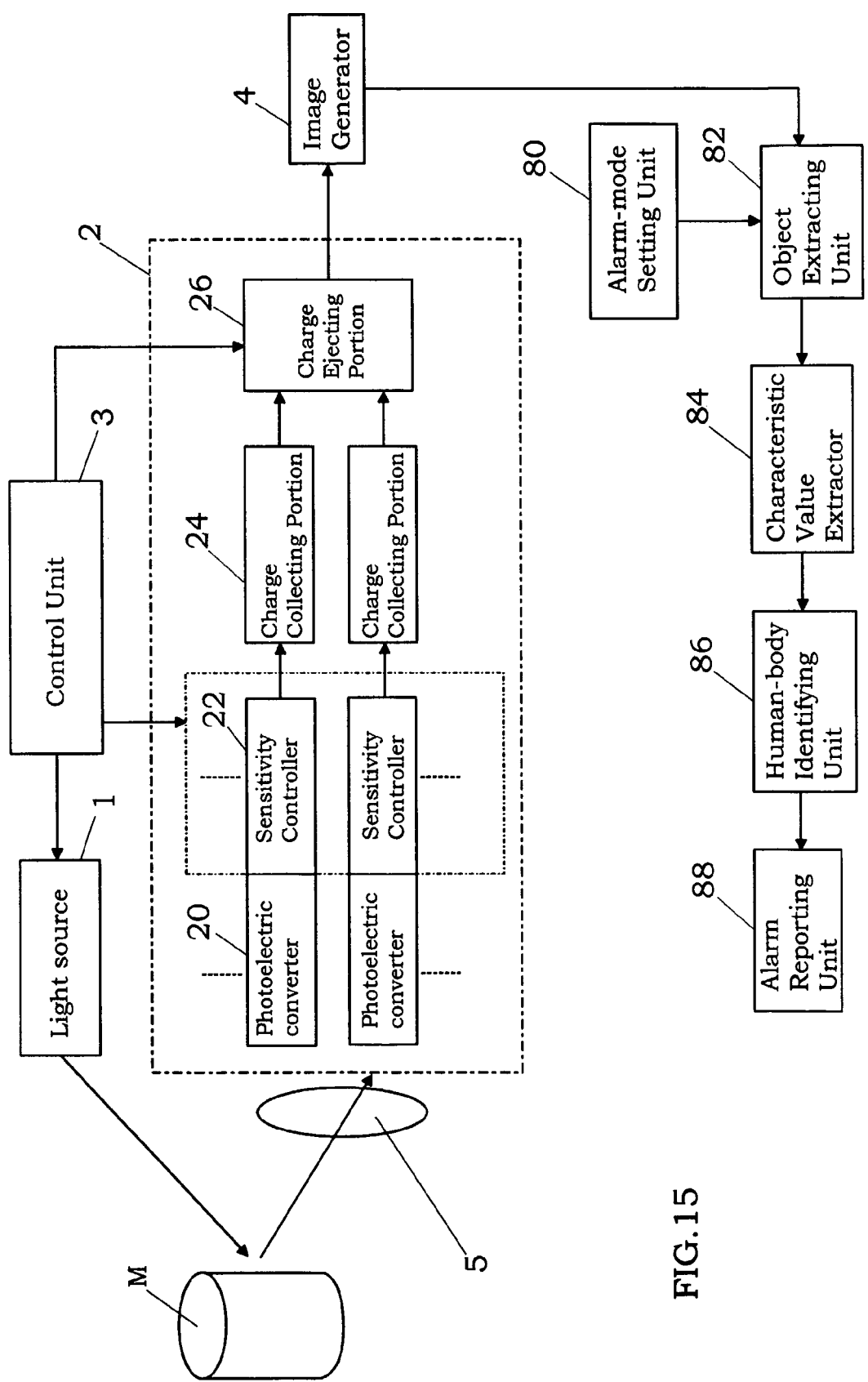
FIG. 15 is a block diagram of an image processing device according to a fifth embodiment of the present invention.

As shown in FIG. 15, the image processing device is characterized by comprising an alarm-mode setting unit 80 for setting an alarm mode against unwanted people, object extracting unit 82 configured to set an alarm region in the distance image, and extract a group of pixels each having the distance value within a predetermined range from the alarm region as the object, characteristic-value extractor 84 configured to extract a characteristic value of the object extracted by the object extracting unit 82, and human-body identifying unit 86 for determining as to whether the object is a human body in accordance with the characteristic value extracted by the characteristic-value extractor 84, and an alarm reporting unit 88 for sending an alarm signal to a base unit of the TV interphone when the object is determined as the human body by the human-body identifying unit 86. The object extracting unit 82, characteristic-value extractor 84, human-body identifying unit 86 and the alarm reporting unit 88 can be actualized by installing a required software in a microcomputer. The alarm-mode setting unit 80 is, for example, actualized by use of a switch.

Figure 16:
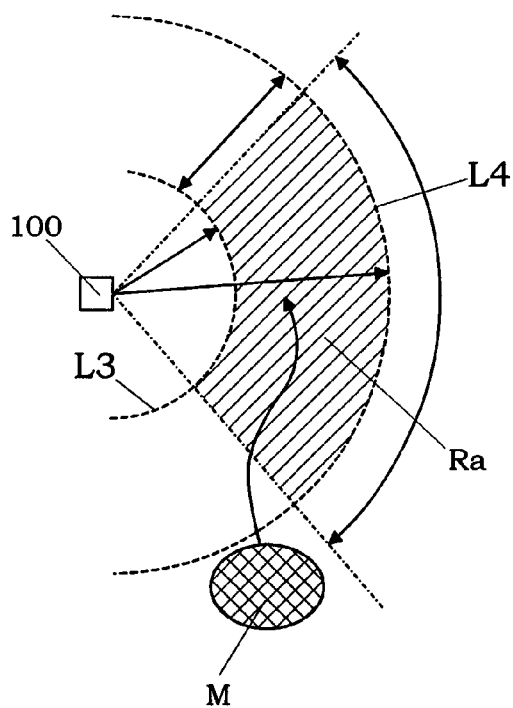
FIG. 16 is a schematic diagram illustrating an operation of the image processing device.

In FIG. 16, "Ra" designates an alarm region surrounded by two dashed lines extending from the TV interphone 100 and two dotted arcuate lines L3, L4. The pixels each having the distance value within the alarm region Ra are extracted as the object by the object extracting unit 82. In the characteristic-value extractor 84, a pattern matching method is performed by use of a suitable template to extract a portion having a high similarity as the characteristic value. Then, in the human-body identifying unit 86; an area of the extracted characteristic value is compared with a given threshold value to determine whether the object is the human body.

According to the TV interphone of this embodiment, when a stranger comes in the alarm range Ra, the object M is extracted by the object extracting unit 82, and the object is determined as the human body by the human-body identifying unit 86. As a result, the alarm signal is sent to the base unit of the TV interphone. On the other hand, when the object other than the human body such as cat or dog comes in the alarm range Ra, the human-body identifying unit 86 determines that the object is not the human body. Therefore, the alarm signal is not sent to the base unit of the TV interphone.

If necessary, the TV interphone described above may comprise a human sensor for sensing heat emitted from the human body such as pyroelectric infrared sensor. In this case, since the control unit 3 of the image processing device firstly receives an output of the human sensor, and then the TV interphone starts to operate, it is possible to save electric power consumption of the TV interphone.

INDUSTRIAL APPLICABILITY

As described above, according to the present invention on the precondition that a light intensity-modulated at a modulation frequency is irradiated to the target space, and the light reflected from an object in the target space is received by the light receiving element, the distance value and the gray value are generated from the electrical output corresponding to the intensity of the received light. Therefore, it is possible to obtain the distance image and the gray image, which are substantially identical in time. In addition, since each of the gray values of the gray image and a corresponding distance value of the distance image are obtained from the same pixel, there is an advantage that no complex treatment of associating each of positions in the gray image with the corresponding distance value is needed. The image processing device of the present invention having the above advantages will be preferably used in various applications such as a monitoring camera for factory automation or a security camera for airports or other facilities as well as a TV interphone for home use.

The invention claimed is:

1. An image processing device, comprising:
a light source configured to irradiate a light intensity-modulated at a modulation frequency to a target space;
a light receiving element configured to receive the light reflected from an object in the target space and generate an electrical output corresponding to an intensity of the received light;
an image generator configured to generate a distance image having pixel values, each of which provides a distance value between the object and the image processing device, in accordance with a phase difference between the light emitted from said light source and the light received by said light receiving element, and a gray image having pixel values, each of which provides a gray value of the object, in accordance with the intensity of the received light;
a differentiator configured to generate a distance differential image having pixel values, each of which provides a distance differential value, from said distance image, and a gray differential image having pixel values, each of which provides a gray differential value, from said gray image; and an outline extractor configured to extract an outline of the object by use of said distance differential image and said gray differential image.

2. The image processing device as set forth in claim 1, wherein said outline extractor extracts, as the outline of the object, a first region where said distance differential value maximizes in said distance differential image, and a second region where said gray differential value maximizes in said gray differential image.

3. The image processing device as set forth in claim 1, wherein said outline extractor determines a first region where said distance differential value maximizes in said distance differential image, and a second region where said gray differential value maximizes in said gray differential image, and then extracts a corresponding region between said first region and said second region as the outline of the object.

4. The image processing device as set forth in claim 1, wherein said outline extractor extracts, as the outline of the object, at least one first region where said distance differential value is equal to or more than a threshold value in said distance differential image, and a second region where said gray differential value is equal to or more than a threshold value in said gray differential image.

5. The image processing device as set forth in claim 1, wherein said outline extractor determines a weighted sum of said distance differential value of each of said pixels of said distance differential image and said gray differential value of a corresponding pixel of said gray differential image, and then extracts a region where the weighted sum is equal to or more than a threshold value as the outline of the object.

6. An image processing device, comprising:
a light source configured to irradiate a light intensity-modulated at a modulation frequency to a target space;
a light receiving element configured to receive the light reflected from an object in the target space and generate an electrical output corresponding to an intensity of the received light; and
an image generator configured to generate a distance image having pixel values, each of which provides a distance value between the object and the image processing device, in accordance with a phase difference between the light emitted from said light source and the light received by said light receiving element, and a gray image having pixel values, each of which provides a gray value of the object, in accordance with the intensity of the received light,
wherein said image generator generates said gray image in a time-series manner, and the image processing device further comprises a differentiator configured to generate a gray differential image having pixel values, each of which provides a gray differential value, from said gray image, and an object detector configured to detect the object by use of said gray differential value and said distance value.

7. The image processing device as set forth in claim 6, wherein said object detector generates a difference image between a pair of gray differential images, which are generated from two gray images obtained at different times, extracts a region where each of pixel values is equal to or more than a threshold value in said difference image, and then detects said region as the object when a representative value of the pixel values of said distance image corresponding to said region is within a predetermined range.

8. The image processing device as set forth in claim 6, wherein said object detector generates a plurality of difference images, each of which is a difference between two of at least three gray differential images generated from at least three gray images obtained at different times,
extracts a region where each of pixel values is equal to or more than a threshold value with respect to each of said difference images to obtain binary images, performs a logical operation between each of pixel values of one of said binary images and a corresponding pixel value of another one of said binary images to extract a common region therebetween, and
detects said common region as the object when a representative value of the pixel values of said distance image corresponding to said common region is within a predetermined range.

9. An image processing device, comprising:
a light source configured to irradiate a light intensity-modulated at a modulation frequency to a target space;
a light receiving element configured to receive the light reflected from an object in the target space and generate an electrical output corresponding to an intensity of the received light;
an image generator configured to generate a distance image having pixel values, each of which provides a distance value between the object and the image processing device, in accordance with a phase difference between the light emitted from said light source and the light received by said light receiving element, and a gray image having pixel values, each of which provides a gray value of the object, in accordance with the intensity of the received light;
a reference-pixel detector configured to detect, as a reference pixel, a pixel having a minimum distance value in a predetermined region in said distance image;
a pixel extractor configured to set a specific region including said reference pixel in said distance image, and extract a group of pixels each having the distance value within a predetermined range from said specific region; and
an exposure controller configured to control a sensitivity of said light receiving element in accordance with the gray image having the pixels, each of which has a one-to-one correspondence with one of the pixels extracted by said pixel extractor.

10. The image processing device as set forth in claim 9, wherein a lower limit of said predetermined range is the distance value of said reference pixel, and an upper limit of said predetermined range is determined by adding a required value to the distance value of said reference pixel.

* * * * *